Patented May 28, 1935

2,002,640

UNITED STATES PATENT OFFICE 2,002,640

PROCESS FOR MAKING RUBBER THREAD

Norman G. Madge, Providence, R. I., assignor, by mesne assignments, to United States Rubber Company, New York, N. Y., a corporation of New Jersey No Drawing. Application May 4, 1932, Serial No. 609,335

3 Claims. (Cl. 18—54)

This invention relates to a process for making rubber thread, and more particularly a process for manufacturing filaments, threads or bands, hereinafter generically termed "thread", from coagulable dispersions of elastic materials, such as rubber latex.

The process for manufacturing rubber thread from aqueous dispersions of rubber by passing a stream of such rubber dispersion through an orifice into a bath of coagulant and continuously withdrawing a formed rubber thread from the coagulating bath and subsequently drying and vulcanizing, if desired, has been known for some time.

The present invention relates to a modification of this process of streaming an aqueous dispersion of rubber through an orifice or nozzle into a coagulant wherein a more sharply defined thread, that is, one which more accurately takes the shape of the nozzle through which it is extruded, is produced.

In the preferred method of carrying out my invention, I pass a stream of aqueous dispersion of rubber into a coagulant for the rubber dispersion through a nozzle of the size and shape desired, which is cooled in any convenient manner, as by circulating a cooling medium through hollow chambers in the same. The cooling of the nozzle to a temperature lower than the temperature of the dispersion streamed through it produces a more sharply defined thread and one which more accurately takes the shape of the nozzle than in the ordinary practice today. This is especially valuable where it is desired to prepare threads of various more or less complicated cross sections by passing aqueous dispersions of rubber through nozzles the orifice of which have the shape of the thread desired. The increased sharpness of the definition of the thread is due in a large measure to the increased viscosity of the dispersion as it passes through the nozzle into the coagulating medium, which also is preferably cooled below the temperature of the dispersion.

The advantages of the present invention may be obtained when the nozzle has been cooled to a temperature lower than the temperature of the dispersion streaming through it, but not low enough to freeze the dispersion, in which case the improvement results almost entirely from the increase in viscosity due to the lowering of the temperature. However, it is desirable in some cases, and easily made possible by various cooling media, to cool the nozzle to such an extent that the dispersion streaming through the same is partially frozen to a slushy consistency. As a general rule, coagulation will not take place as a result of freezing but will take place in the coagulating bath as in the ordinary practice today, or where, as above described, the nozzle is cooled to a temperature above the freezing point of the dispersion. It is possible, however, and extremely advantageous, to sometimes compound the aqueous dispersion of rubber so that the dispersion itself will coagulate on freezing. For example, a latex composition which will coagulate on freezing, and which might be called a "cold-sensitive latex" may be prepared in the following manner. To 153.1 grams of a once-creamed latex (containing 65.3% solid constituents) are added with moderate mixing the following compounding ingredients: an emulsion of .5 gram of heptene base (an accelerator) and .06 gram of ammonium laurate in .88 gram of water; .63 cubic centimeter of 28% ammonia together with 1.133 grams of water; a paste of 4 grams of crimson antimony sulphide, 4 grams of precipitated sulphur, .5 gram of 20% aqueous ammonium laurate, with 9 grams of water; 1.288 grams of sodium silicate; and a paste of 1 gram of zinc oxide and .04 gram of glue in 1.50 grams of water. Such a rubber dispersion on being streamed through a nozzle cooled to a temperature low enough to freeze the same, will be coagulated in the nozzle. In such a case, it is not essential that the thus frozen and coagulated filament be streamed into a coagulant, since it is possible to pass the filamentary coagulum thus formed into water or volatile solvent or directly onto a belt for drying. However, even when such a cold-sensitive latex is used and a coagulated stream results from freezing in the nozzle, it is preferable to pass the coagulated thread into a suitable coagulant, preferably cooled as above described, to completely harden and set the thread. The size of the thread depends upon the size of the nozzle, the rate of flow of the rubber dispersion through the nozzle, the nature of the dispersion, the rate of coagulation of the dispersion, and the rate of withdrawal of the filament from the nozzle. According to the present invention, various well known coagulants, such as aqueous solutions of acetic acid, preferably containing from 10 to 25% acetic acid, or alcohol, or mixtures of acetic acid and alcohol, may be used as thread forming coagulants, and various other coagulants will be apparent to those skilled in the art. After the dispersion has been streamed through the orifice or nozzle and into the coagulant, it is removed from the coagulant, washed, if desired, and dried.

The aqueous dispersion of rubber may be vulcanized, or it may be unvulcanized with or without vulcanizing ingredients added thereto. If vulcanized thread is desired, it may be obtained by compounding the rubber dispersion with suitable vulcanizing ingredients, forming a thread therefrom and vulcanizing the final product; or it may be also formed from a vulcanized rubber dispersion, as suggested above; or a thread formed from unvulcanized rubber dispersion without vulcanizing ingredients may be subjected to the action of vulcanizing liquids or vapors, or to solutions containing vulcanizing ingredients. It is obvious that the size and shape of the nozzle, the viscosity of the latex, the method of drying the filament, the composition of the rubber dispersion with reference to the various compounding ingredients, the rate of flow of the dispersion through the nozzle, and the rate of withdrawal of the filament from the nozzle, may be varied as desired. The term "aqueous dispersion of rubber" in the description and claims is used to designate broadly coagulable dispersions of elastic materials, including artificial dispersions of rubber or rubber-like materials, as well as natural latex, which may be preserved or otherwise treated, and which may be in a normal, diluted, concentrated or purified condition compounded as desired and produced by methods well known in the art.

Various other modifications will be apparent to persons skilled in the art and it is understood that I do not intend to limit myself to the specific improvements described above except as indicated in the appended claims.

Having thus described my invention, what I claim and desire to protect by Letters Patent is:

1. A process for making rubber thread comprising passing a stream of aqueous dispersion of rubber into a coagulant for the rubber dispersion through a nozzle cooled sufficiently to freeze the dispersion.

2. A process for making rubber thread comprising passing a stream of aqueous dispersion of rubber coagulable on freezing through a nozzle cooled sufficiently to freeze the dispersion.

3. A process for making rubber thread comprising passing a stream of aqueous dispersion of rubber coagulable on freezing through a nozzle cooled sufficiently to freeze the dispersion and then into a coagulant to completely harden and set the thread.

NORMAN G. MADGE.